June 30, 1959   J. H. LINDARS   2,892,938
SIGNAL DELAY CIRCUIT ARRANGEMENTS
Filed July 11, 1957
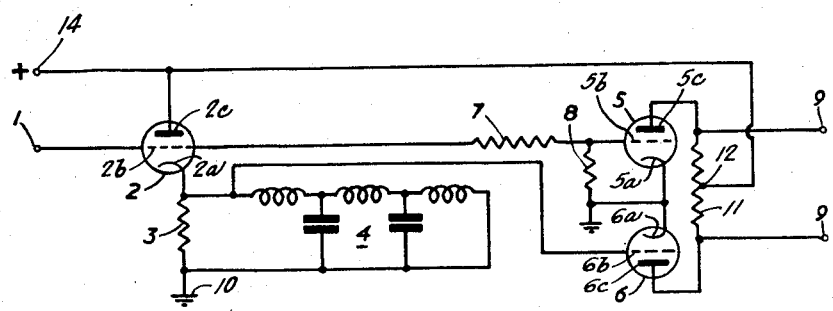
INVENTOR:
John Henry Lindars
BY:
Baldwin & Wight
ATTORNEYS

United States Patent Office 2,892,938
Patented June 30, 1959

2,892,938

SIGNAL DELAY CIRCUIT ARRANGEMENTS

John Henry Lindars, Chelmsford, England, assignor to Marconi's Wireless Telegraph Company Limited, London, England, a British company Application July 11, 1957, Serial No. 671,189

Claims priority, application Great Britain August 31, 1956

5 Claims. (Cl. 250—27)

This invention relates to signal delay circuit arrangements and has for its object to provide improved simple and economical signal delay circuit arrangements whereby an input signal which may be of positive or negative polarity or have positive and negative portions and which may be either periodic and regular, or quite irregular in form may be subjected to a predetermined time delay. The invention, though of general application, is particularly advantageous for use in certain fish finding echo sounders in which it is required to delay signals corresponding to transmission and/or echo pulses. Electrical delay lines are relatively expensive devices and of course their cost is, in general, proportional to the electrical length. If, therefore, a given required delay can be obtained by means of an electrical delay line whose overall electrical length from one end to the other corresponds to only one half of the delay time required, there will be a substantial saving in cost even though some other apparatus is necessary to enable the delay line to be used so as to give twice its normal end-to-end delay. It is, of course, known to delay a signal by means of a delay line which is caused to give twice its end-to-end delay by arranging it as a reflecting delay line so that an input signal traverses the said line twice, once in each of two opposite directions, but known circuit arrangements for doing this depend on utilizing the reflecting line to produce a reflected signal which is separable from the input signal by being reversed in polarity with respect thereto, so that such known circuit arrangements are limited in their application to the handling of more or less regular periodic signals of one polarity. The present invention avoids this limitation and provides improved delay circuit arrangements in which a reflecting line is used and which are of general application.

According to this invention a signal delay circuit arrangement comprises in combination a reflecting electrical delay line arranged to provide a required time delay for a signal which enters it at one end and is reflected back to that end; a differential amplifier; means for applying undelayed signals (which are to be delayed) to said line and also as one of the inputs to said differential amplifier, and means for applying the undelayed signals together with delayed signals from said line as the other input to said differential amplifier, whereby the undelayed signals applied to said amplifier oppose one another providing an amplifier output consisting at least approximately wholly of delayed signals.

Preferably the undelayed signals are applied to a cathode follower across the cathode leg resistance of which the input terminals of the reflecting delay line are connected, said cathode leg resistance being arranged to match the surge impedance of the line so as to prevent second reflections down the line of return reflected signals from the far end thereof. In the simplest embodiments of the invention the delay line is a normal multi-sectioned line short circuited at its far end.

Preferably also the differential amplifier comprises two valves (they may, of course, be the two halves of a double valve) back to back, the grid of one valve being connected to the grid of the cathode follower and the grid of the other being connected to the "live" input terminal of the delay line.

The invention is illustrated in the accompanying drawing which shows diagrammatically one embodiment thereof.

Referring to the drawing, signals to be delayed, for example, positive going pulses occurring in a fish finding echo sounder, are applied at input terminal 1 to the grid 2b of a cathode follower including the valve 2 containing cathode 2a, grid 2b and anode 2c, and across whose cathode leg resistance 3 is connected the input terminals of a reflecting delay line 4. The delay line is caused to be reflecting by being short circuited at its far end, i.e. at the end remote from the resistance 3. The resistance 3 is made equal to the surge impedance of the line so that a signal set up across the said resistance 3 will pass down the line to be reflected back from its far end but will not be again reflected into the line.

The signals applied to the grid 2b of the valve 2 are also applied to the grid 5b of one valve 5 of a back-to-back differential amplifier consisting of the valves 5 and 6 where the valve 5 contains cathode 5a, grid 5b and anode 5c; and where valve 6 contains cathode 6a, grid 6b and anode 6c, while the cathode 2b of the valve 2 is connected to the control grid 6b of the other valve 6 of said amplifier. Since, in practice, the gain of the cathode follower will be a little less than unity, resistances 7 and 8, either or both of which may be adjustable, are preferably provided in the lead from terminal 1 to the grid 5b of valve 5 and between said grid 5b and earth 10. The resistances may be chosen or adjusted to be of such values as to compensate for any departure of the cathode follower from unity gain. For simplicity separate valves 5 and 6 are shown, but in practice they would probably be constituted by a double valve, i.e. a double triode if triodes are selected for use in the differential amplifier. Output is taken at terminals 9 across the output resistance 11 whose mid-tap 12 is connected to a source of positive potential indicated at 14 to which anode 2c of valve 2 also connects.

The circuit operates as follows:

Undelayed signals applied to the valve 2 and to the valve 5 are also applied to the input terminals of the line 4 and reappear across resistance 3 delayed by a time equal to twice the time corresponding to the electrical length of the line measured from one end to the other. The signals set up across resistance 3 will, therefore, consist of the undelayed signals plus the delayed signals reflected back by the line. By suitably dimensioning the elements of the circuit in accordance with well known principles, the result can be achieved that the undelayed signals applied to the valves 5 and 6—in the one case from the grid 2b of the valve 2 and in the other from the the cathode 2a thereof—substantially cancel out in the amplifier 5—6 leaving practically only the delayed signals at the output terminals 9. If the cathode follower were of unity gain substantially complete cancellation would be obtained without the provision of resistances 7 and 8. In many cases the gain of the cathode follower will be sufficiently near unity to give approximate cancellation without said resistances and such approximate cancellation may be all that is required. However the resistances 7 and 8 may be provided to give better cancellation whenever approximate cancellation is not good enough. In this way a delay corresponding to twice the overall end-to-end length of the line 4 is obtained with the aid of only very simple additional apparatus, namely that constituted by the double valve differential amplifier 5—6, while the signal to be delayed can be of either or both polarities and any form—not necessarily a periodic pulse signal.

I claim:

1. A signal delay circuit arrangement comprising in combination a reflecting electrical delay line arranged to provide a required time delay for a signal which enters it at one end and is reflected back to that end; a differential amplifier; means for applying to said line only signals which are to be delayed, means for applying to one input of said differential amplifier said undelayed signals, whereby the undelayed signals applied to said amplifier oppose one another providing an amplifier output consisting at least approximately wholly of delayed signals.

2. A signal delay circuit arrangement as set forth in claim 1 wherein the undelayed signals are applied to a cathode follower having at least a cathode, a grid and an anode and containing a cathode leg resistance across which the input terminals of the reflecting delay line are connected, said cathode leg resistance matching the surge impedance of the line.

3. A signal delay circuit arrangement as set forth in claim 1 wherein the undelayed signals are applied to a cathode follower having at least a cathode, a grid and an anode and containing a cathode leg resistance across which the input terminals of the reflecting delay line are connected, said cathode leg resistance matching the surge impedance of the line, said delay line having a line input terminal immediately adjacent the connection of one side of said delay line with said cathode of said cathode follower wherein the differential amplifier comprises two valves connected back to back, each including at least a cathode, a grid and an anode, the grid of one valve of said differential amplifier being connected to the grid of the cathode follower and the grid of the other of said two valves being connected to the said live input terminal of the delay line.

4. A signal delay circuit arrangement comprising in combination an electron tube constituting a cathode follower containing at least a cathode, a grid, and an anode, a signal input terminal connected with said grid, a cathode leg resistance connected between said cathode and ground, a differential amplifier including cathode means, separate control grids and coacting anodes, a connection extending from the grid of said cathode follower to one of the grids of said differential amplifier, a resistance extending between said last mentioned one of the grids of said differential amplifier ground and a connection from said grounded end of said last mentioned resistance and said cathode means of said differential amplifier, a reflecting delay line having an input end and a reflecting end, connections from said input end with said cathode leg resistance of said cathode follower, a connection between the other grid of said differential amplifier with the input end of said reflecting delay line, a resistance connected between the anodes of said differential amplifier, an output circuit connected with opposite potential positions along said last mentioned resistance and a power supply circuit for all of said anodes extending from a mid-point in said last mentioned resistance to a positive potential anode supply source.

5. A signal delay circuit as set forth in claim 4 in which a series resistance is interposed in the connection extending between the grid of said cathode follower and the first mentioned grid of said differential amplifier.

References Cited in the file of this patent

UNITED STATES PATENTS

| | | |
|---|---|---|
| 2,217,957 | Lewis | Oct. 15, 1940 |
| 2,266,154 | Blumlein | Dec. 16, 1941 |
| 2,433,379 | Levy et al. | Dec. 30, 1947 |
| 2,707,751 | Hance | May 3, 1955 |